United States Patent [19]

Komatsu et al.

[11] 3,930,041
[45] Dec. 30, 1975

[54] HERMETIC SEALING PROCESS UTILIZING MULTIPLE HEAT-SEALING STEPS

[75] Inventors: Yoshihiro Komatsu, Kawasaki; Izumi Kakuta, Tokyo; Kanemichi Yamaguchi, Yokohama, all of Japan

[73] Assignee: Toyo Seikan Kaisha Limited, Tokyo, Japan

[22] Filed: Apr. 24, 1973

[21] Appl. No.: 354,121

[30] Foreign Application Priority Data
Apr. 27, 1972 Japan.............................. 47-42372
Apr. 27, 1972 Japan.............................. 47-42373

[52] U.S. Cl. .................... 426/396; 53/39; 156/306; 156/311; 156/312; 426/410
[51] Int. Cl.² .... C09J 5/00; B65B 7/06; B32B 31/20
[58] Field of Search .......... 53/39; 156/69, 306, 312, 156/498, 583, 311; 426/392, 395, 410, 404, 396

[56] References Cited
UNITED STATES PATENTS

| | | | |
|---|---|---|---|
| 3,052,926 | 9/1962 | Quinche et al. ................ | 156/304 X |
| 3,278,358 | 10/1966 | Rosewicz et al. .................... | 156/306 |
| 3,326,735 | 6/1967 | Beason............................... | 156/272 |
| 3,364,091 | 1/1968 | Conti................................. | 156/306 |
| 3,506,516 | 4/1970 | Baumann........................... | 156/226 |
| 3,545,983 | 12/1970 | Woods............................... | 426/395 |

*Primary Examiner*—Douglas J. Drummond
*Assistant Examiner*—Robert A. Dawson
*Attorney, Agent, or Firm*—Diller, Brown, Ramik & Wight

[57] ABSTRACT

The hermetic sealing process for deaerating and heat-sealing a packaged article comprising a container having a heat-sealable resin coating on the inner surface of an area to be heat-sealed and contents filled in said container, under such an atmosphere that an easily-condensable vapor or a condensate thereof is present on innerfaces to be heat-sealed, which process comprises applying, at least once to the area to be heat-sealed of the packaged article, heat-sealing temperature and pressure necessary for melting and press-bonding the heat-sealable resin and cooling the formed heat-sealed area under elevated pressure; wherein the pressure applied at the overpressure cooling step or the second heat-sealing step is made higher than the saturated vapor pressure of the easily-condensable vapor at the temperature of the resin coating in the molten or softened state, and said pressure is applied to the heat-sealed area at a temperature lower than the temperature applied at the preceding heat-sealing step.

18 Claims, 10 Drawing Figures

HERMETIC SEALING PROCESS UTILIZING MULTIPLE HEAT-SEALING STEPS

This invention relates to a process for hermetic sealing of heat-sterilizable packaged articles. More particularly, the invention relates to a hermetic sealing process for forming a heat-sealed area of a high seal credibility in a heat-sealable packaged article such as a so-called retort pouch, while excluding the head space air effectively.

Recently, there have been broadly used pouched articles prepared by packaging a cooked or semi-cooked food into a container having an inner layer composed of a heat-sealable resin film, for instance, a flexible pouch or formed container composed of a laminate of a metal foil such as aluminum foil or steel foil and a polyethylene, polypropyrene or polyamide film, heat-sealing the packaged container, sterilizing it under high temperature and high pressure conditions in a retort (autoclave) and thereby imparting to the packaged food an excellent preservability comparable to that of a canned food. In these packaged articles, a seal credibility in the heat-sealed area is an important factor, and it is required to reduce the head space air content to a level as low as possible.

In case the head space air is included in such a heat-sealable and retortable packaged article, the following disadvantages are brought about.

1. In a flexible pouch or formed container, if air is included therein, the rate of heat penetration toward the center of the packaged article is greatly influenced and air exists in a maximum thickness area of the packaged article to form an interfacial barrier, inhibiting penetration of heat toward the package center.

2. If there is a deviation of the included air content in packaged articles, overcooking or insufficient sterilization is caused to occur, and hence, it is impossible to obtain products of uniform quality.

3. Vitamins, colored constituents, fat and oil, flavor components, etc. of a packaged food are oxidized and degraded by oxygen existing in air included in the packaged article, and such undesirable phenomena as browning are caused to occur, damaging appearance of contents.

4. When a packaged article is heated with hot water before eating or drinking, pouch breakage is frequently caused to occur.

In order to obviate these disadvantages, the following operations are conducted in the conventional methods for excluding air contained in a packaged article prior to the heat-sealing operation:

1. So called vacuum evacuation operation in which air in the packaged article is excluded by vacuumization.

2. Hot filling operation in which a cooked or semi-cooked food is filled in a container under hot condition and air in the packaged article is replaced by steam evolved from the food.

3. Exhausting evacuation operation in which a packaged article is heated and included air is replaced by steam generated from the food contained.

4. Steam flashing evacuation operation in which steam is positively flashed in the packaged article from an opening thereof and included air is replaced by the so fed steam.

In the foregoing conventional methods for excluding air contained in a packaged article prior to the heat-sealing operation (except the vacuum evacuation method), a vapor phase or liquid phase of a heterogeneous substance, i.e., water, should naturally be present on the innerfaces of the area to be heat-sealed. Further, when a cooked or semi-cooked food is packaged in a container or when the head space air is deaerated or reduced by pressing the packaged article, a fluid food or the like frequently contaminates an area to be heat-sealed which is present in the opening portion of the container.

In heat-sealing of a resin film, even when a solid substance is present on the innerfaces to be heat-sealed, if it is possible to crush this substance by the heat-sealing pressure and embed it into the resin film, the influence on the sealability by the presence of such substance is not so great. However, if a liquid or a liquid-containing material is present on the innerfaces to be sealed, a vapor is generated at a vapor pressure depending on the heating temperature at the time of heat-sealing, and when the heat-sealing pressure is released, bubbles of said vapor should naturally be formed. Further, since the resin layer is in the molten state under such heat-sealing conditions, these bubbles can move relatively freely, with the result that bubbles are made greater or communicate with each other to form large voids and the sealing effect is frequently degraded.

We have now found that in deaerating and heat-sealing a packaged article comprising a container having a heat-sealable resin coating on the inner surface of an area to be heat-sealed and contents filled in said container, under such an atmosphere that an easily-condensable vapor or a condensate thereof is present on innerfaces to be heat-sealed, by conducting once or twice the press-heating and sealing operation for melt-bonding of innerfaces of an area to be heat-sealed and the press-cooling operation for cooling and solidifying the heat-sealable resin coating sealed area, if the second press-heating and sealing operation or the press-cooling operation is conducted under specific pressure and specific temperature conditions, it is made possible to compress, disperse, finely divide and confine bubbles of within the interface of the sealed area even if a great quantity of a vapor or condensate is present on the innerfaces to be heat-sealed, and a very high seal credibility is attained in the heat-sealed area.

It is therefore a primary object of this invention to provide a process for deaerating and heat-sealing a packaged article filled with contents, especially a fluid food, according to which a heat-sealed area of a high seal credibility can be formed even when the deaerating and heat-sealing are conducted under such an atmosphere that an easily-condensable vapor or a condensate thereof is present on the innerfaces to be sealed.

Another object of this invention is to provide a process for heat-sealing a heat-sterilizable packaged article, such as a retortable pouch, according to which an interior void or head space air harmful for sterilization, preservation and re-heating of food contents can be excluded as much as possible and a heat-sealed area of a high seal credibility can be formed.

Still another object of this invention is to provide a process for heat-sealing a packaged article, according to which such a heat-sterilizable packaged article of a high seal credibility can be obtained relatively simply by conducting the heat-sealing operation only once and the press-cooling operation only once.

In accordance with this invention, there is provided an improvement of the hermetic sealing process for deaerating and heat-sealing a packaged article comprising a container having a heat-sealable resin coating on the inner surface of an area to be heat-sealed and contents filled in said container, under such an atmosphere that an easily-condensable vapor or a condensate thereof is present on innerfaces to be heat-sealed, which process comprises applying, at least once to the area to be heat-sealed of the packaged article, heat-sealing temperature and pressure necessary for melting and press-bonding the heat-sealable resin coating and cooling the formed heat-sealed area under elevated pressure; said improvement being characterized in that the pressure applied at the overpressure cooling step or the second heat-sealing step is made higher than the pressure applied at the preceding heat-sealing step and also higher than the saturated vapor pressure of the easily-condensable vapor at the temperature of the resin coating in the molten or softened state, and said pressure is applied to the heat-sealed area at a temperature lower than the temperature applied at the preceding heat-sealing step.

In this invention, the heat-sealing procedure can be conducted once or twice. In case the heat-sealing procedure is conducted only once, it is desired that the press-cooling step is conducted so that the foregoing pressure conditions are satisfied. In case the heat-sealing procedure is conducted two times, the second heat-sealing procedure is carried out so that the foregoing pressure conditions are satisfied.

In accordance with one preferred embodiment of this invention, there is provided a hermetic sealing process for forming a heat-sterilizable packaged article having a sealed area excellent in seal characteristics, by deaerating and heat-sealing a packaged article comprising a container having a heat-sealable resin coating on the inner surface of an area to be heat-sealed and contents filled in said container, under such an atmosphere that an easily-condensable vapor or a condensate thereof is present on innerfaces to be heat-sealed, said process comprising applying to the area to be heat-sealed of the packaged article heat-sealing temperature and pressure necessary for melting and press-bonding the heat-sealable resin coating and immediately thereafter, applying under cooling to the heat-sealed area of the packaged article a pressure being higher than the heat-sealing pressure and being within a range expressed by the following formula:

$$Ps + 5 \geq P \geq Ps - 1$$

wherein P stands for a pressure ($Kg/cm^2$ gauge) adopted at the press-cooling step and Ps designates the saturated vapor pressure of the easily-condensable vapor ($Kg/cm^2$ gauge) corresponding to the temperature $T_1$ (°C) of the heatseal bar at the heat-sealing procedure.

In accordance with another preferred embodiment of this invention, there is provided a hermetic sealing process for forming a heat-sterilizable packaged article having a sealed area excellent in seal characteristics, by deaerating and heat-sealing a packaged article comprising a container having a heat-sealable resin coating on the inner surface of an area to be heat-sealed and contents filled in said container, under such an atmosphere that an easily-condensable vapor or a condensate thereof is present on innerfaces to be heat-sealed, said process comprising applying to the area to be heat-sealed of the packaged article heat-sealing temperature $T_1$ and pressure $P_1$ necessary for melting and press-bonding the heat-sealable resin coating, then applying to the formed heat-sealed area a temperature $T_2$ which is lower than the first heat-sealing temperature $T_1$ but higher than the temperature at which the heat-sealable resin coating begins melting or softening and a pressure $P_2$ which is higher than the first heat-sealing pressure $P_1$ and also higher than the saturated vapor pressure of the easily-condensable vapor corresponding to said temperature $T_2$, and cooling the heat-sealed area under an elevated pressure.

This invention will now be illustrated more detailedly.

Packaging Container

In the instant specification, a container in which contents are not filled is called "packaging container" or merely "container", and a container in which contents are filled is called "packaged article".

Any of containers can be used in this invention, as far as it has a space for containing contents therein and comprises an area to be heat-sealed around the periphery of said containing space or around the periphery of a filling opening. In order to effect the heat-sealing on such container, it is necessary that the area to be heat-sealed of the packaging container or the inner layer of the packaging container should be composed of a heat-sealable resin coating or film. This packaging container may take a form of a flexible bag, namely a flexible pouch. More specifically, it is possible to employ as a packaging container a bag-like material prepared by overlapping laminates composed of an inner layer of a heat-sealable resin film and an outer layer of a heat-resistant resin such as polyethylene terephthalate or a metallic foil such as an aluminum foil or laminates composed of an inner layer of a heat-sealable resin film, an intermediate layer of a metallic foil and an outer layer composed of a heat-resistant resin, and heat-sealing side portions of such laminated article.

For better illustration, this invention will now be described by reference to accompanying drawings, in which.

Figure 1:
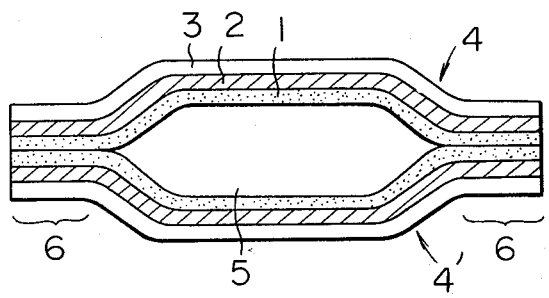
FIG. 1 is a diagram illustrating the section of a bag-like container to be used in this invention.

For instance, as is illustrated in FIG. 1, a baglike container formed by overlapping laminates 4, 4' composed of a polyolefin film inner layer 1, an aluminum foil intermediate layer 2 and a polyester film outer layer 3, and forming a heat-sealed portion 6 around a space 5 for containing contents therein can be used as a packaging container in this invention.

Figure 2:
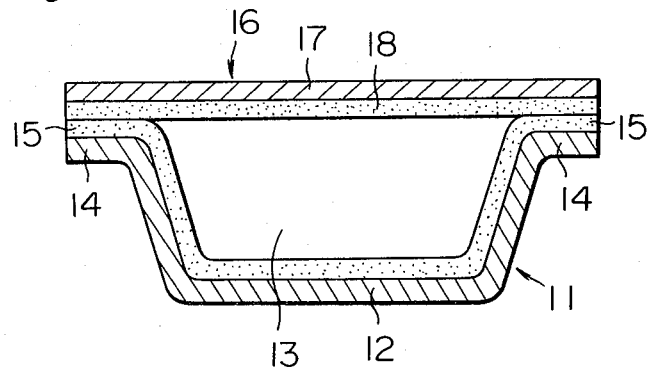
FIG. 2 is a diagram illustrating the section of a formed semi-rigid container to be used in this invention.

Further, a container comprising a container body having a space for containing contents therein and a flange portion, and a cover, in which the heat-sealing is conducted between the flange portion of the container body and the cover (hereinafter called "formed semi-rigid container") can be used as a packaging container in this invention. In this case, the container body takes an optional form having a space for containing contents therein, for instance, a form of such a food container as a dish or tray, e. g., a lunch dish, a roasting tray or a cake tray, a flying-pan, a sukiyaki pan, a stew-pan, a pot or kettle, a cup, a lunch-box, and the like. The cover has a form such that it can seal an opening portion of the container body completely together with the flange portion of the container body. The body of the container is formed to have a desired form by molding a metallic foil or sheet by press molding or other shaping technique. The body has a heat-sealable resin film or coating on the entire of the inner surface or on the flange portion which is to be heat-sealed with the cover. The cover is composed of a substantially gas-impermeable material such as a metallic foil or sheet or a laminate of a metallic foil or sheet and a resin film. For instance, as is illustrated in FIG. 2, a container body 11 is composed of a metallic sheet 12 and has a food-containing space 13 and a flange portion 14 provided around the food-containing space 13, each being formed by press molding. A heat-sealable resin film 15 is coated on the inner face of the flange portion 14. A cover 16 consists of a metallic foil or sheet 17 and a heat-sealable resin film 18 applied on the inner surface of the metallic foil or sheet 17. When said flange portion 14 and cover 16 are pressed under heating, the heat-sealing is accomplished between them.

As the heat-sealable resin to be used for constituting the inner surface of a heat-sealed area of a sealed packaged article, there may be employed known heat-sealable resins heretofore used for structures of this type. It is preferred that these heat-sealable resins soften or melt at a temperature lower than 250°C., especially lower than 180°C. In view of the strength of the heat-sealed area, it is preferred that the heat-sealable resin to be used is crystalline. From the foregoing viewpoints, in this invention it is especially preferred that a polyolefin is used as the heat-sealable resin.

It is possible to employ as the polyolefin a polymer of interpolymer of an olefin expressed by the following formula

wherein R stands for a hydrogen atom or an alkyl group having up to 4 carbon atoms.

As such polyolefin, there may be mentioned, for instance, low density, medium density and high density polyethylenes, isotactic polypropylene, crystalline ethylene-propylene copolymers, polybutene-1, polypentene-1, poly-4-methylpentene-1, etc. Of course, the polyolefin to be used in this invention is not limited to an olefin homopolymer and an interpolymer of two or more olefins, but a copolymer of an olefin with a small amount of other comonomer not damaging inherent properties of polyolefin may be used in this invention. For instance, a copolymer of an olefin with up to 5 mole % of other ethylenic unsaturated monomer such as vinyl chloride, vinyl acetate, acrylic acid or its ester, methacrylic acid or its ester, etc.

It is sufficient that the polyolefin to be used in this invention has a film-forming molecular weight. For instance, a polyolefin having an average molecular weight ranging from 5000 to 40000 (corresponding to a melt index (ASTM 1338) ranging from 0.05 to 5.0 g/10 min.) is generally employed in this invention.

In this invention, a resinous composition so-called hot melt is used as the heat-sealable resin instead of such polyolefin as mentioned above. For instance, a composition comprising an olefin-vinyl acetate copolymer and a wax can be used in this invention.

Still further, polyamides or polyesters having a relatively low melting point may be used as the heat-sealable resin instead of the polyolefin in this invention. For instance, there are polyamides or interpolyamides composed of recurring units expressed by the following general formula

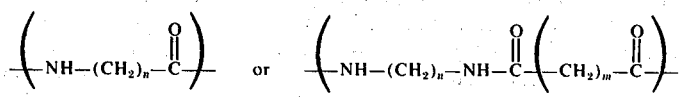

wherein $n$ is a number of 3 to 13 and $m$ is a number of 1 to 4.

Examples of such polyamides and interpolyamides include poly-$\omega$-aminocaproic acid, poly-$\omega$-aminoheptanoic acid, poly-$\omega$-aminopelagonic acid, poly-$\omega$-aminodecanoic acid, poly-$\omega$-aminoundecanoic acid, poly-$\omega$-aminododecanoic acid, poly-$\omega$-aminotridecanoic acid, polyhexamethyleneadipamide, polyhexamethylenesebacamide, polyhexamethylenedodecamide, polyhexamethylenetridecamide, polydecamethyleneadipamide, polydecamethylenesebacamide, polydecamethylenedodecamide, polydecamethylenetridecamide, polydodecamethyleneadipamide, polydodecamethylenedodecamide, polydodecamethylenetridecamide, polytridecamethyleneadipamide, polytridecamethylenesebacamide, polytridecamethylenedodecamide, polytridecamethylenetridecamide, polyhexamethyleneazelamide, polydecamethyleneazelamide, polydodecamethyleneazelamide, polytridecamethyleneazelamide, and interpolyamides thereof.

As the polyester having a relatively low melting point, there may be employed polyesters and copolyesters having a melting or softening point lower than 250°C., such, for example, as polytetramethylene, terephthalate, polytetramethylene terephthalate/isophthalate, polyethylene terephthalate/isophthalate, poly-1,4-cyclohexylenedimethylene terephthalate-isophthalate copolymers, etc.

In general, it is preferred that the inner layer composed of such heat-sealable resin has a thickness of 0.005 to 0.5 mm (5 to 500 $\mu$). In case the thickness of the heat-sealable resin layer is less than 0.005 mm, it is sometimes difficult to attain a sure sealing by heat-sealing of the packaged article. In case the thickness of the heat-sealable resin layer exceeds 0.5 mm, the flexibility of the heat-sealed area is lost or it is difficult to conduct the heat-sealing operation at a high speed.

A resin having a softening point or decompositing point higher than that of the heat-sealable resin is used as the heat-resistant resin constituting the outer surface layer of a flexible laminate material for the container. It is preferred that a suitable resin is selected from resins having a melting point exceeding 150°C. so that the above requirement is satisfied. Examples of such heat-resistant resins to be used in this invention include polyamide, polyester, polycarbonate, polypropylene and cellulose ester resins.

These heat-resistant resins will now be exemplified more specifically.

1. Polyamides selected from the above-mentioned polyamides and having a relatively high softening point.
2. Polyesters composed of the recurring units expressed by the following formula

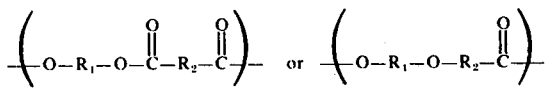

wherein $R_1$ stands for an alkylene or cycloalkylene group having 2 to 8 carbon atoms and $R_2$ is an arylene group.
Specific examples of such polyester include polyethylene terephthalate, polytetramethylene isophthalate, polyethylene terephthalate/isophthalate, poly-p-ethyleneoxybenzoate, poly-1,4-cyclohexylenedimethylene terephthalate, etc.

3. Polycarbonates composed of the recurring units expressed by the following formula

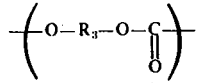

wherein $R_3$ stands for a hydrocarbon group having 8 to 15 carbon atoms.
Specific examples of such polycarbonate include poly-p-xyleneglycol-biscarbonate, polydioxydiphenylmethanecarbonate, polydioxydiphenylethane-carbonate, polydioxydiphenyl-2,2-propane-carbonate, polydioxydiphenyl-1,1-ethane-carbonate, etc.

4. Isotactic polypropylene, especially biaxially stretched films thereof.
5. Cellulose esters, for example, acetyl celluloses differring in the acetylization degree.

In general, it is preferred that such heat-resistant resin layer has a thickness of 0.012 to 0.5 mm (12 to 500 $\mu$). In case the thickness of the heat-resistant resin layer is less than 0.012 mm, in heat-sealing a laminate material, the gas barrier properties are degraded or the strength or impact resistance of the laminate material is lowered. In case the heat-resistant resin layer thickness exceeds 0.5 mm, the flexibility of the laminate material is lost.

In this invention, as the metallic foil or sheet in the flexible laminate material or formed semi-rigid container, there may be employed a steel foil or sheet, an aluminum foil or sheet, a sheet prepared by plating such a metal as tin, chromium, aluminum or the like on the surface of a steel sheet, and a sheet prepared by chemically treating or electrolitically treating the surface of a steel plate with chromic acid, phosphoric acid or the like. In general, the thickness of the metallic foil or sheet is selected within a range of 5 to 200 $\mu$ appropriately depending on the intended use. For instance, in the case of a formed semi-rigid container, the thickness of the metallic sheet or foil is so selected that the container per se has a form-retaining property, and in the case of a flexible laminate material, the thickness is so selected that the flexibility is not lost.

Filling and Sealing of Contents

In this invention, in case a packaging container is a bag-like container or pouch of a laminate material, after the container is prepared by melt-bonding the laminate material, a food is filled in the container and deaeration is conducted. In case a packaging container is a formed semi-rigid container, a food is filled in this container and deaeration is conducted.

Cooked or semi-cooked foods which are heat-sterilized before preservation and are heated before eating or drinking are suitable as the food to be packed in such container. As such cooked or semi-cooked foods, there may be mentioned, for example, cooked curry sauce, cooked hashed sauce, stews such as borscht and beef stew, gravies such as meat sauce, boiled products of vegetables, fishes and/or meats such as vinegared pork, sukiyaki, stuffs for Chinese bun, happosai, cooked chicken and cream-boiled tuna, soups such as consomme soup, potage, miso soup, pork-miso soup and Japanese chowder, rice foods such as boiled rice, cooked rice together with red beans, kamameshi, rice-gruel, frizzled boiled rice and pilau, noodles such as spaghetti, buckwheat micelli and wheat micelli, food additives such as Chinese bamboo shoot and additives for kamameshi and Chinese noodles, fancy foods such as boiled red beans and thick bean-meal soup with sugar and rice cake, meat-processed foods such as quenelle, hamburger, and corned beef, and cooked fishes such as eels roasted with sugared soy and fishes broiled with soy.

According to this invention, after a cooked or semi-cooked food is filled in a container, deaeration is carried out for excluding air and other gas harmful for heat-sterilization, preservation and re-heating, Deaeration can be accomplished conveniently by any of the following methods:

a. A method in which air and other gas are excluded by reducing the pressure inside the packaged article, for instance, a vacuum evacuation method.

b. A method in which air and other gas in the packaged article are replaced by steam, for instance, a hot filling method, an exhausting evacuation method and a steam flashing method. c. A method in which head space air or the like is excluded by deforming the flexible packaged article under application of pressure.

In the conventional techniques, when deaeration and heat-sealing are carried out under such an atmosphere that the ambient atmosphere temperature is higher than room temperature and a great quantity of steam is present in the atmosphere and is converted to minute condensed water drips (under an atmosphere maintained at a temperature lower than the dew-point), for instance, in case a water-containing food is hot-filled, the head space air is excluded by steam flashing or a packaged article having a heat-sealable resin film in the inner layer is heat-sealed in a closed chamber filled with saturated or superheated steam, in the case of a film of a hydrophobic thermoplastic resin such as polyolefin a vapor pressure is generated depending on the heat-sealing temperature because of incompatibility of condensed steam on the innerfaces to be heat-sealed resulting in formation of bubbles, and in the case of a film of a hydrophillic thermoplastic resin such as polyamide bubbles having a vapor pressure corresponding to the heat-sealing temperature are formed from water adsorbed in the resin and saturated water not only on the heat-sealed interface but also in the interior of the sealing material, with the result that a complete seal credibility required for a packaged article to be sterilized cannot be obtained. Further, in the case of a water-containing food, at the time of filling the food or of deaeration, water adheres in the form of drips to the periphery of a filling opening on which heat-sealing is effected and the heat-sealed interface is formed, with the result that attainment of complete sealing is inhibited because of the presence of such water drips.

On the other hand, according to this invention, a heat-sealed area of a high seal credibility can be formed even under such an atmosphere that an easily-condensable vapor such as steam is present on the sealed interface, by adopting the specific heat-sealing procedure or specific overpressure cooling procedure which will now be detailed.

Sealing Procedure I

According to this invention, the first heat-sealing is conducted by applying, to an area to be heat-sealed of the packaged article, temperature $T_1$ and pressure $P_1$ necessary for melting and press-bonding a heat-sealable resin film. This first heat-sealing operation may be performed under known temperature and pressure conditions. Preferred temperature and pressure ranges vary to some extent depending on the kind of the heat-sealable resin used, but in general, it is preferred that the first heat-sealing operation is carried out under such temperature and pressure conditions as will satisfy the following requirements:

$Ts + 130 \geq T_1 \geq Ts + 30$, and $Ps > 1$ and $P_1 \geq 0.5$ wherein $T_1$ is a temperature (°C.) of a heatseal bar at the first heat-sealing step, $Ts$ designates a temperature (°C.) at which the heat-sealable resin of the packaged article begins softening or melting, $P_1$ stands for a pressure (Kg/cm² gauge) of the heat-seal bar at the first heat-sealing step, and $Ps$ designates the saturated steam pressure (Kg/cm² gauge) corresponding to the temperature $T_1$.

In the instant specification, the softening- or melting-beginning temperature $Ts$ of the heat-sealable resin is defined to be a temperature at which the rising begins in a heat absorption curve determined by a differential scanning calorimeter. Further, it is considered that the pressure applied to the area to be heat-sealed approximates the pressure of the heat-seal bar.

The time necessary for the first heat-sealing operation varies depending on the thickness of the heat-sealable resin film or the type of the container, but it is sufficient that the heat-sealing is conducted for a time sufficient to perform the melting and press-bonding of the heat-sealable resin film, for instance, 0.1 to 5 seconds. More specifically, in the case of high density polyethylene, the heat-sealing is customarily carried out at a heat-seal bar temperature of 160° to 260°C., under a pressure of 0.5 to 5 Kg/cm² gauge being applied to the area to be heat-sealed for 0.3 to 3 seconds, and also in this invention, the heat-sealing may be conducted under such conditions. In the case of polypropylene, it is preferred that the heat-sealing temperature is 180° to 280°C. and the pressure and time are almost equal to those adopted in polyethylene. Similarly, it is preferred that the heat-seal bar temperature is 200° to 280°C. in the case of nylon-12 and 240° to 300°C. in the case of polytetramethylene terephthalate.

In accordance with one embodiment of this invention, immediately after the first heat-sealing operation, preferably within 0.3 to 3 seconds from the termination of the first heat-sealing operation, the second heat-sealing operation is carried out. It is especially important that this second heat-sealing operation is conducted at a heat-seal bar temperature $T_2$ which is lower than the first heat-sealing temperature $T_1$ but is higher than the softening-or melting-beginning temperature $Ts$ of the heat-sealable resin and under a pressure $P_2$ which is higher than the first heat-sealing pressure $P_1$ and also higher than the saturated vapor pressure $Ps'$ of the easily-condensable vapor corresponding to the second heat-sealing temperature $T_2$. Such conditions are expressed by the following formulae:

$P_2 > Ps'$
$P_2 > P_1$ and $T_1 > T_2 \geq Ts$

At the second heat-sealing step, the temperature and pressure applied to heat-sealed area are very important factors. The primary object of the second heat-sealing operation is that the flowability of the heat-sealable resin in the molten or fluid state is reduced by the second heat-sealing and the resin is cooled to an appropriate temperature, whereby the vapor pressure of steam bubbles confined in the interface and thus the movement of the steam bubbles is controlled and prohibited. For attaining this object, the heat-seal bar temperature, i.e., the second heat-sealing temperature, is adjusted in the vicinity of the melting point of the heat-sealable resin film. A secondary object of the second heat-sealing operation is that since steam or its condensate occluded in sealed interface is diffused or dispersed in the form of bubbles broadly along the heat-sealed interface by the saturated steam pressure formed at the first heat-sealing temperature and such bubbles take frequently such distribution state that they penetrate through the heat-sealed area, a sealing pressure higher than the saturated steam pressure is applied to the heat-sealed interface, to thereby prevent formation of bubbles at the time of the sealing pressure application and thus prevent dispersion of bubbles. Accordingly, the second heat-sealling step of this invention is characterized in that a temperature lower than the first heat-sealing temperature and a pressure higher than the first heat-sealing pressure are applied. The first and second heat-sealing steps of this invention can clearly distinguished from the conventional heat-sealing steps.

In the field of ordinary packaging engineering, it has been known to conduct the heat-sealing in two stages and effect the cold pressing in the final stage. In this known method, in order to prevent occurrence of incomplete sealing at the high speed sealing operation, an area to be heat-sealed is pre-heated at the first heat-sealing step and the substantial sealing is accomplished at the second heat-sealing step. In this known method, the first and second heat-sealing steps are usually conducted under the same conditions. More specifically, in the case of, for instance, high density polyethylene, the heat-sealing temperature is higher than 165°C. and since too high a heat-sealing pressure causes a flow of the resin from the heat-sealed area to lessen the thickness of the resin layer at ends of the sealed area, a relatively low pressure such as 0.5 to 5 Kg/cm$^2$ gauge is adopted as the heat-sealing pressure. Under such conditions, however, if water is present in innerfaces to be heat-sealed, it is impossible to prevent formation of coarse bubbles on the sealed interface by the heat-sealing operation.

In order to obviate such undesired phenomenon, it may be considered to conduct the heat-sealing twice after substitution of the head space air of a packaged article by steam and then conduct the overpressure cooling once, while making the second heat-sealing temperature and pressure higher than those adopted at the first heat-sealing step, whereby coarse bubbles formed on the sealed interface will be diffused, dispersed and finely divided in a range as broad as possible. In this case, it is indeed possible to prevent formation of continuous bubbles. However, it is a defect that bubbles are dispersed in a relatively broad range of the heat-sealed interfacial area. As compared with such method, according to this invention it is made possible to confine bubbles formed on the heat-sealed interface within a relative narrow range and simultaneously divide them finely.

Differences of the heat-sealing conditions and the state of residual bubbles between the process of this invention and the conventional method will now be detailed by reference to accompanying drawings.

Figure 3:
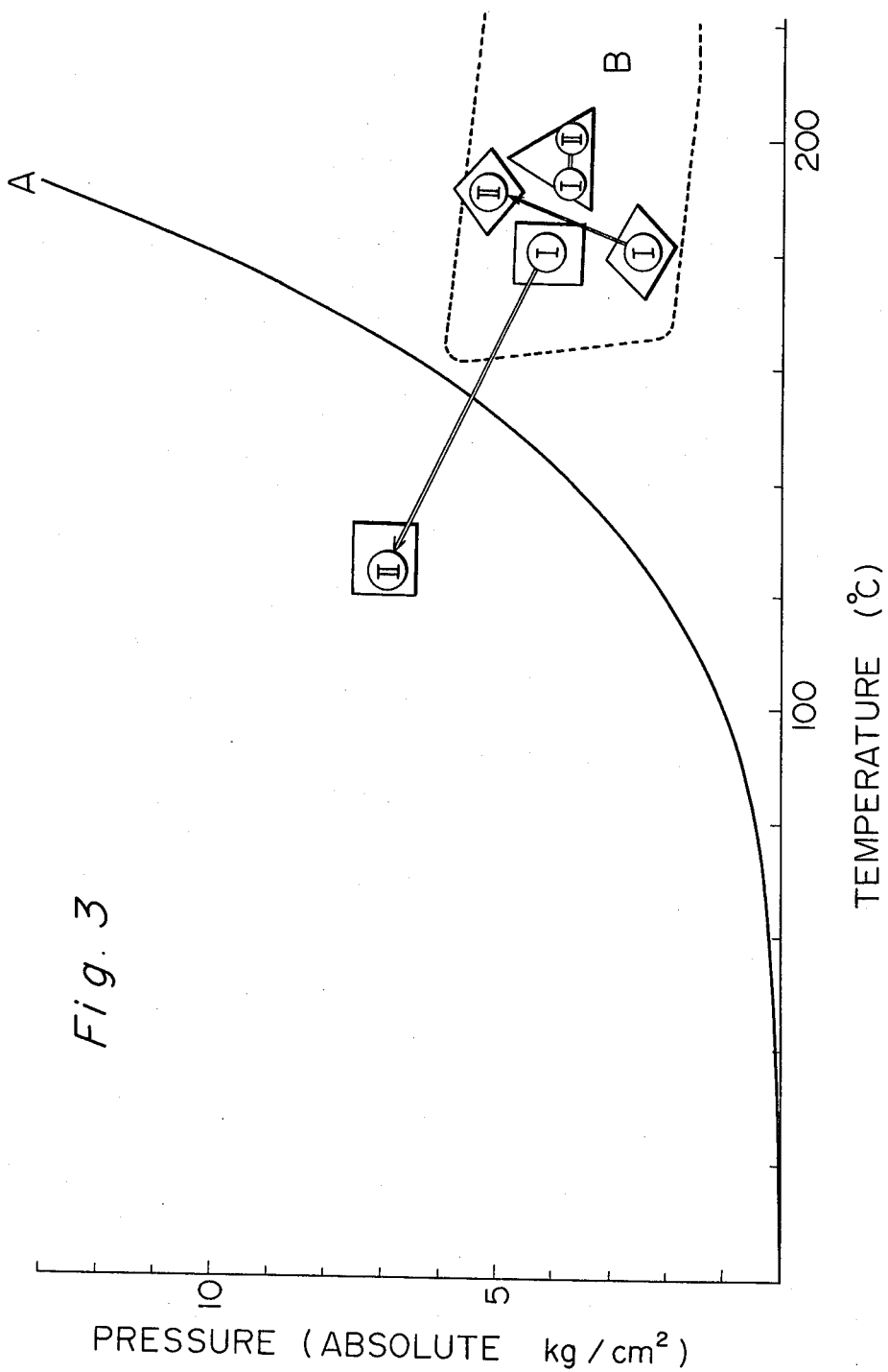
FIG. 3 is a curve illustrating heat-sealing conditions adopted in the process of this invention and the conventional process.

In FIG. 3, the ordinate indicates the heat-sealing pressure (Kg/cm$^2$) and the abscissa indicates the heat-sealing temperature (°C.). Curve A is a temperaturepressure curve of saturated steam. The region on the left of the curve (above the curve) is a region in which bubbles are not formed, and the region on the right of the curve (below the curve) is a region in which bubbles are formed. A region B surrounded by the dotted line indicates the known heat-sealing conditions, the region ① indicating the first heat-sealing conditions and the region ② indicating the second heat-sealing conditions.

Figure 4:
FIG. 4 and FIG. 5 are stereomicroscopic photographs of sealed interfacial area formed by the conventional process.

In the known method in which the first heatsealing and second heat-sealing steps are conducted under the same conditions (conditions defined by the triangle region in FIG. 3), as shown in a stereomicroscopic photograph (magnification = 30) of FIG. 4, coarse bubbles are formed on the sealed interface.

Figure 7:
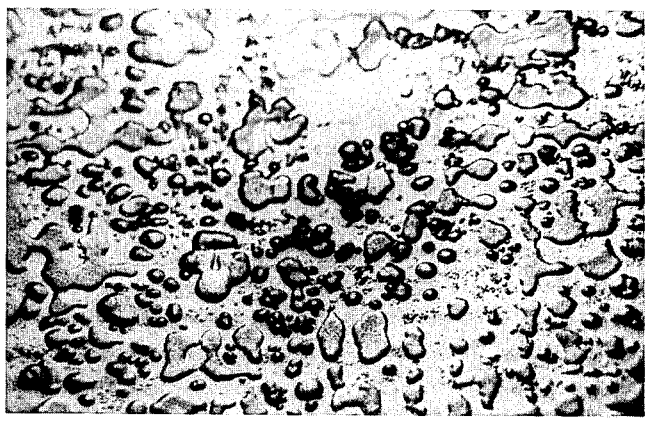
FIG. 7 is a stereomicroscopic photograph showing the sealed interfacial area formed by a process outside the scope of this invention.

In the comparative method in which the second heat-sealing temperature and pressure are higher than those adopted at the first heat-sealing step (conditions defined by the rhombic region in FIG. 3), as is shown in a stereomicroscopic photograph (magnification = 30) of FIG. 7, bubbles are dispersed in a relatively broad range, though they are finely divided.

Figure 8:
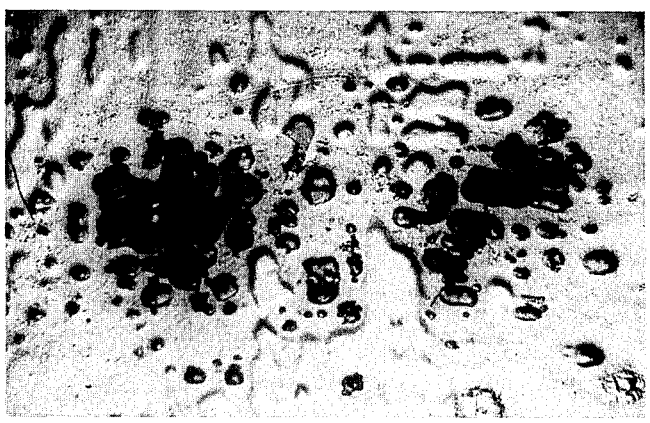
FIG. 8 is a stereomicroscopic photograph showing the sealed interfacial area formed by one preferred embodiment of the process of this invention.

In contrast, in the process of this invention in which the first heat-sealing conditions are located on the right of the curve A and below the curve A and the second heat-sealing conditions are located on the left of the curve A and above the curve A (conditions defined by two squares in FIG. 3), as is illustrated in a stereomicroscopic photograph (magnification = 30) of FIG. 8, bubbles are confined within a relatively narrow range of the sealed interfacial area and they are finely divided.

The reasons why residual bubbles are confined within such a narrow range by conducting the second sealing step under specific conditions in this invention are as follows:

1. By maintaining the heat-sealing temperature below the region ①, it is made possible to keep the sealed material in the lowly fluid and highly viscous state. In other words, bubbles cannot move freely.

2. The saturated steam pressure is lowered and becomes lower than the sealing pressure. As a result, the volume occupied by bubbles is reduced. Under such conditions, the interbonding of the sealed material has been completed.

3. When the heat-sealing step is terminated and the sealing pressure is released, though the steam pressure is formed, the lowering of the temperature is caused to occur by the adiabatic expansion, with the result that the viscosity of the sealing material is further heightened and spreading of bubbles is prevented.

4. When the overpressure cooling step begins, since the temperature of the sealing material is low, steam is likely to condensate, and the phase change from the gas to the liquid results in abrupt reduction of the volume. Since the sealed material present in the vicinity of bubbles is in the still softened state, it is press-bonded to confine the bubbles within a small area.

According to the process of this invention, even when the pressure applied at the second sealing step is relatively high, since the second heat-sealing temperature is maintained at a low level, such a defect as flowing-out of the resin from the sealed area is not brought about. However, in this invention, it is desired that the pressure applied at the second heat-sealing step is as low as possible, so long as it is higher than the saturated steam pressure.

Preferred temperature and pressure conditions are expressed by the following formulae:

$Ps' + 5 \geqq P_2 \geqq Ps'$, and $Ts + 50 \geqq T_2 \geqq Ts$ wherein $Ps'$, $P_2$, $Ts$ and $T_2$ are as defined above.

Especially preferred temperature and pressure conditions are as follows:

| Heat-Sealable Resin | Pressure per Sealed Area (Kg/cm$^2$ gauge) | Heat-Sealing Bar Temperature $T_2$(°C.) |
| --- | --- | --- |
| high density polyethylene | Ps' to 5 | 118 to 128 |
| Polypropylene | Ps' to 7.5 | 165 to 175 |
| nylon-12 | Ps' to 10 | 177 to 187 |
| polytetramethylene terephthalate | Ps' to 26 | 225 to 235 |

In accordance with this embodiment of this invention, the so formed heat-sealed area is cooled under pressure by optional means to obtain a sealed area of a high seal credibility. Immediately after the second heat-sealing step, preferably within 0.3 to 3 seconds from the termination of the second heat-sealing step, a pressure is applied to the heat-sealed area still kept in the semi-molten or softened state, by means of an unheated seal bar, preferably two confronting cooling plates maintained at a temperature below 50°C. The applied pressure may be equal to either the pressure applied at the first sealing step or the pressure applied at the second sealing step. The effects attained by this overpressure cooling operation are those of cooling and condensing bubbles of steam formed at the time of releasing the second heat-sealing pressure by the saturated vapor pressure corresponding to the second heat-sealing temperature to thereby reduce extremely the area occupied by the bubbles while increasing the area occupied by the semi-molten or softened heat-sealable resin present in the vicinity of the bubbles, and of finely dividing the bubbles by crushing-bonding of the sealed material to thereby improve the surface condition in the entire sealed area and impart a good appearance thereto. Accordingly, this overpressure cooling step is indispensable in the hermetic sealing process of this invention.

Heat-Sealing Procedure II

In accordance with another embodiment of this invention, the first heat-sealing operation mentioned above with respect to the heat-sealing procedure I is conducted, and immediately thereafter, preferably within 0.3 to 3 seconds from the termination of the first heatsealing step, a pressure which is higher than the heatsealing pressure and satisfies the following requirement $$Ps + 5 \geq P \geq Ps - 1,$$
especially $P \geq Ps$
is applied under cooling to the heat-sealed area of the packaged article.

The object of the overpressure cooling step in this embodiment is to compress and finely divide steam bubbles formed on sealed interface at the heat-sealing step and confine them within a certain narrow distribution range. The problems involved for attainment of this object are as follows:

a. how to rapidly condense the volume occupied by saturated steam (22400 cc per mole in STP) to the volume occupied by water (18 cc per mole in STP), and how rapidly fill the condensed volume with the heat-sealable resin (hereinafter referred to as "sealant") in the fluid state; and b. how to conduct condensation of steam rapidly and completely.

In this invention, in order to solve the above problems, the press-cooling is conducted under a pressure equal to the saturated vapor pressure corresponding to the temperature of the sealant after the heat-sealing step or a pressure approximating said vapor pressure. When such overpressure cooling operation is conducted, steam bubbles undergo an outer pressure higher than the pressure of the bubbles, with the result that they cannot be present in the form of bubbles and they are rapidly dissolved or diffused in the sealant or converted to water occupying a very small volume. Further, at a higher pressing pressure, the density of the sealant is increased to effect "embedment" of bubbles very rapidly. In this embodiment of this invention, it is specified that the lower limit of the pressure applied at this overpressure cooling step is lower by 1 Kg/cm², preferably by 0.5 Kg/cm², than the saturated vapor pressure $Ps$ corresponding to the seal-bar temperature. The reason is that while the packaged article is transferred from the heat-sealing step to the overpressure cooling step, it is sometimes naturally cooled and in such case, even under such pressure condensation, size-reduction and embedment of steam bubbles can be accomplished sufficiently. In case too high a pressure is applied, the sealant escapes from the heat-sealed interfacial area, which results in reduction of the strength in the edge portions of the heat-sealed area. For this reason, it is important that the upper limit of the pressure is ($Ps$ + 5) Kg/cm². Of course, in view of the saturated steam pressure, in this embodiment, it is important that the pressure P applied at the press-cooling step should satisfy the following requirement:

$$Ps'' + 5 \geq P \geq Ps''$$

wherein $Ps''$ stands for the saturated steam pressure corresponding to the temperature T of the sealant just before the overpressure cooling.

The difference between the sealant temperature after the heat-sealing step and the heat-seal bar temperature varies to some extent depending on the structure and thickness of the packaging material and the heating time, and the former temperature is generally lower by 10° to 80°C. frequently by 20° to 40°C. than the latter temperature. Accordingly, at the overpressure cooling step of this embodiment of this invention, the pressure applied to the unit area of the sealed innerface should be 1 to 15 Kg/cm² in the case of high density polyethylene, 2.7 to 18 Kg/cm² in the case of polypropylene, 5 to 20 Kg/cm² in the case of nylon-12 and 14 to 25 Kg/cm² in the case of polytetramethylene terephthalate. Such pressure is much higher than the press-cooling pressure adopted in the conventional technique which is less than 1 Kg/cm² and is about 0.5 Kg/cm² in many cases. For this reason, a care must be taken in this embodiment to prevent the sealant from escaping from the sealed area. From this viewpoint, it is desired that the cooling press has a curved face structure on the side having a contact with the inner portion of the container.

It is sufficient that the temperature adopted at the overpressure cooling step is lower than the temperature at which the vapor present on the sealed interface of the heat-sealed sealant, namely 100°C. in the case of steam. In order to attain the effect that the sealant is rapidly intruded into voids formed by abrupt condensation of steam because of compression and is solidified therein to fix the bubbles, it is desired that the gradient of the cooling rate is great. It is most desired that a cooling press adjusted to 5° to 25°C. is employed. If the temperature of the cooling press is not controlled, when the overpressure cooling step is continued for a long time, the temperature of the cooling press is gradually elevated during the operation by heat transferred from the sealed area of packaged article, with the result that the effect of finely dividing the bubbles into a uniform size cannot be obtained. However, if the temperature of the cooling press is adjusted to an excessively low level, the flowable sealant press-bonded by the heat-sealing step is immediately solidified to reduce the bubble-embedding effect. Further, a sharp difference of the temperature is brought about among the outer, intermediate and inner layers, resulting in formation of distortion in the packaged article, occurrence of waving on the sealed face and partial shrinkage of the packaged article.

The steps of the hermetic sealing process of this embodiment of this invention can be clearly distinguished from the steps of the known sealing method. In the conventional method for heat-sealing packaged articles, the heat-sealing operation and press-cooling operation are carried out under the same pressure within a range of 0.5 to 1 Kg/cm$^2$. However, if such method is conducted for deaeration and sealing under such an atmosphere that an easily-condensable vapor such as steam is present on the innerfaces to be heat-sealed, coarsened or continuous bubbles are formed on the sealed interface with the result that sealing of a high credibility cannot be obtained.

Figure 5:
Figure 6:
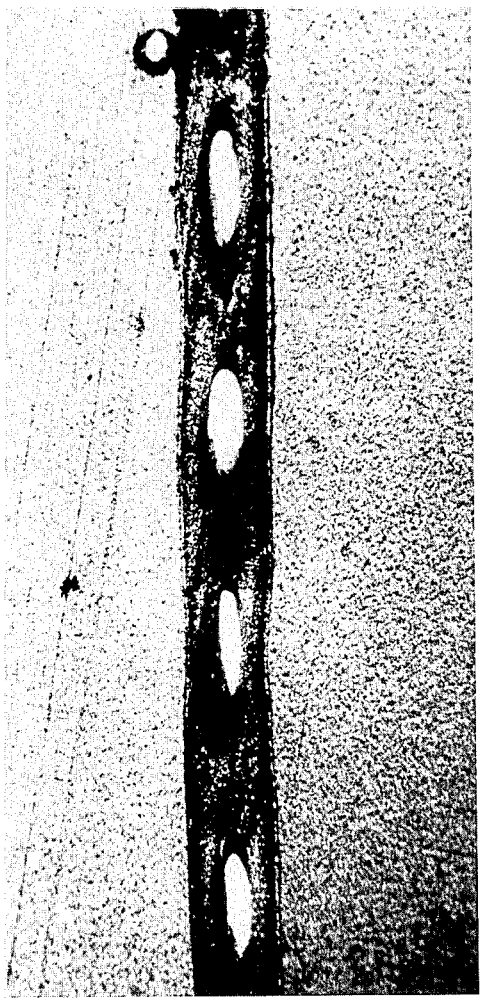
FIG. 6 is a microscopic photograph showing the cross-section of the sealed interfacial area illustrated in FIG. 5.

FIG. 5 is a streomicroscopic photograph of the heat-sealed interfacial area formed by molding a laminate of a high density polyethylene layer (70 $\mu$ in thickness), an aluminum foil (9 $\mu$ in thickness) and a polyethylene terephthalate layer (12 $\mu$ in thickness) into a bag-like container so that the high density polyethylene film forms the inner side of the bag, and conducting content filling, deaeration and heat-sealing according to the known comparative method shown in Example III given hereinafter, and FIG. 6 is a microscopic photograph showing the cross-section of the sealed interfacial area illustrated in FIG. 5.

From these photographs, it will readily be understood that coarse bubbles are formed on the sealed interface along its entire length in the case of the conventional method.

Figure 9:
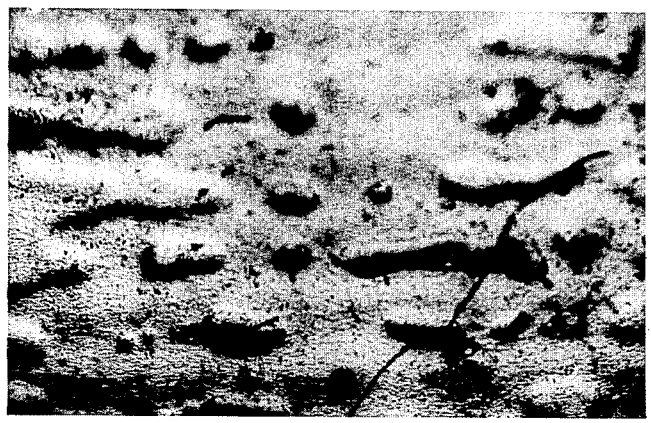
FIG. 9 is a stereomicroscopic photograph showing the sealed interfacial area formed by another preferred embodiment of the process of this invention.
Figure 10:
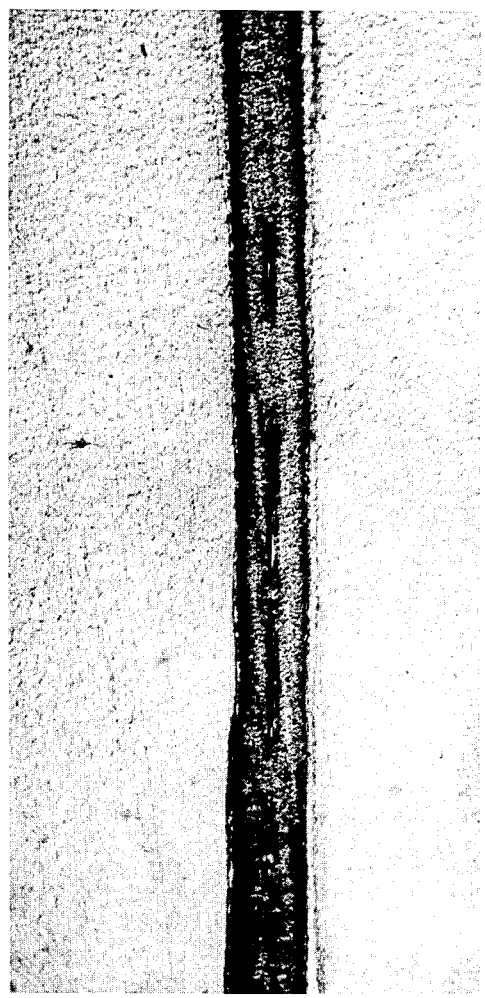
FIG. 10 is a microscopic photograph showing the cross-section of the sealed interfacial area illustrated in FIG. 9.

FIG. 9 is a stereomicroscopic photograph of the sealed interfacial area formed by subjecting a bag composed of the above laminate to the content filling, deaeration and heat-sealing according to the method of Example III given hereinafter, and FIG. 10 is a microscopic photograph showing the cross-section of the sealed interface illustrated in FIG. 9. From these photographs it will readily be understood that according to this invention bubbles can be confined within a very narrow region while finely dividing the bubbles.

The reasons why in this embodiment of this invention it is possible to confine the bubbles within a very narrow region and finely divide them simultaneously are as follows:

a. Although steam bubbles are formed during the heat-sealing operation, during the overpressure cooling step solidification of the sealant and condensation of steam into water are caused to occur, and the bubbles are embedded rapidly.

b. By violent adiabatic compression of steam, the sealant is allowed to rapidly intrude into this steam portion, and division of coase bubbles and lessening of bubbles by condensation thereof are allowed to proceed simultaneously.

In accordance with this invention, as is seen from the foregoing description, it is possible to obtain a retortable sealed packaged article of a very high seal credibility conveniently with ease. Further, this complete seal can be attained even under such a severe atmosphere that steam is present on the innerfaces to be sealed, relatively simply only by conducting the heat-sealing step once and the overpressure cooling step once. It is quite a surprising advantage.

Post-Treatment and Use

As described hereinabove, in accordance with the process of this invention, even when deaeration and heat-sealing are carried out under such an atmosphere that an easily-condensable vapor such as water is present on the innerfaces to be heat-sealed, bubbles can be confined within a very narrow region of the heat-sealed area and in the finely divided state. As a result, a heat-sealed area of a high seal credibility is obtained. Further, as compared with the conventional method, in this invention the head space air or void can be greatly reduced and the sealing can be attained very assuredly. Therefore, when a packaged article according to this invention is subjected to the heat-sterilization treatment, for instance, at 105° to 150°C. under 0.5 to 7 Kg/cm$^2$, the content food can be preserved for a very long time sufficiently. Further, the heat-sterilization and reheating of the packaged article can be accomplished for a relatively short time assuredly with great certainty.

This invention will now be illustrated more detailedly by reference to Examples.

Example I

Cooked meat sauce (pH = 4.8) maintained at 87° – 89°C. was hot-packed continuously into laminate film pouches (13 × 18 cm) composed of an outer layer (12 $\mu$ in thickness) of a biaxially oriented polyethylene terephthalate film, an intermediate layer (9 $\mu$ in thickness) of an aluminum foil and an inner layer (70 $\mu$ in thickness) of a heat resistant polyolefin film in an amount of 180 g per pouch by means of a rotary type filling-sealing machine. Pouches were transported while both side-sealed ends of each pouch was being held by means of a pouch clamp-transporting equipment. Saturated steam maintained under a pressure of 2 Kg/cm$^2$ gauge was flashed for 1.4 seconds into each pouch from above the opening thereof from a stainless steel nozzle opened with 45° from the vertical direction by means of a steam flash apparatus provided with a steam flow control valve. The pouches were further transported and after passage of 2 seconds from termination of the steam flashing, they were subjected to the first heat-sealing treatment at a heat-seal bar temperature of 180°C. under a pressure of 0.5 kg/cm$^2$ being applied on faces to be sealed for 1 second. The pouches were further transported and after passage of 2 seconds from termination of the first heat-sealing treatment, the pouches were subjected to the second heat-sealing treatment for 1 second at a heat-seal bar temperature of 125°C. under a pressure of 2.0 Kg/cm$^2$ being applied to the sealed faces. The saturated steam pressure corresponding to the heat-seal bar temperature adopted at this second heat-sealing treatment was higher by 1.8 Kg/cm$^2$ than the atmospheric pressure, and this saturated steam pressure was lower than the pressure applied by the heat-seal bar. The pouches were further transported and after passage of 2 seconds from termination of the second heat-sealing treatment, the pouches were subjected to the overpressure cooling treatment for 1 second at a press-cooling bar temperature of 25°C. under a pressure of 2.0 Kg/cm$^2$ being applied to the heat-sealed faces. Then, holding of both side-sealed ends was released, and packaged articles were withdrawn. The pouches were subjected to the overpressure heatsterilization at 121°C. under 1.5 Kg/cm$^2$ for 30 minutes in a retort, and they were subjected to the overpressure cooling treatment and the pressure on the retort was released to complete the sterilization treatment. The so obtained packaged article is designated as "Packaged Article I".

For comparison with conventional methods, comparative packaged articles were prepared under the following conditions. Packaged Articles II and III:

Packaged articles II and III were prepared in the same manner as described above except that the heat-seal bar temperature was maintained at 180°C. at both of the first and second heat-sealing treatments, and that at each of the first and second heat-sealing treatments and the subsequent overpressure cooling treatment a pressure of 2.0 Kg/cm$^2$ (packaged article II) or 0.5 Kg/cm$^2$ (packaged article III) was applied to the sealed area.

Packaged Article IV

Packaged article IV was prepared under the same conditions adopted for formation of packaged article I except that the heat-seal bar temperature was 180°C. at the first heat-sealing treatment and 125°C. at the second heat-sealing treatment and that at each of the first and second heat-sealing treatments and the subsequent overpressure cooling treatment a pressure of 0.5 Kg/cm$^2$ was applied to the sealed area.

With respect to 250 samples each of the packaged articles I, II, III and IV, the aluminum foil and polyolefin film were delaminated from each other by a special solution so that the optical inspection was possible. Then, (1) the bubble dispersion area in the sealed interface (2) the bubble diameter and (3) bubble independency were optically evaluated. The sealing state was collectively evaluated according to the rating on the basis of 10 points. This point was expressed in terms of the average value of 250 samples. Results are shown in Table 1.

Table 1

Optical Evaluation of State of Bubbles Included in Heat-Sealed Area

| Packaged Article | Degree of Bubble Dispersion | Bubble Diameter | Bubble Independency | Collective Evaluation |
|---|---|---|---|---|
| I | low | small | good | 9.5 |
| II | medium | medium | fair | 7.2 |
| III | high | large | no good | 4.1 |
| IV | medium | large | fair | 5.8 |

With respect to about 100 samples each of the packaged articles I, II, III and IV, the seal credibility test was conducted in the following manner.

Samples were immersed for 24 hours in a spore suspension (concentration of 10$^7$ spores per ml) containing mainly spores of an anaerobic spore-forming bacterium, *Clostridium pasteurianum*, and then they were preserved for 2 weeks in a thermostat chamber maintained at 30°C. The spoilage of the contents and the gas evolution were examined to obtain results shown in Table 2.

Table 2

Results of Spore Suspension Dipping Test on Packaged Articles

| Packaged Article | Number of Tested Samples | Spoilage (number of samples) | Gas Evolution (number of samples) | Ratio of Defective Samples (%) |
|---|---|---|---|---|
| I | 101 | 0 | 0 | 0.00 |
| II | 112 | 0 | 1 | 0.89 |
| III | 98 | 5 | 4 | 5.10 |
| IV | 106 | 1 | 1 | 0.94 |

Example II

A polypropylene film (50 $\mu$ in thickness) was laminated on the inner face of an aluminum foil (130 $\mu$ in thickness), and the laminate was shallow-draw-press-formed into a semi-rigid container (having an inner capacity of 350 cc). Fuchsine (magenta) as coloring agent was dissolved in a small amount of ethyl alcohol and the solution was diluted with a great amount of water to form a colored solution having a fuchsine concentration of 0.1 to 0.3 %. This solution was maintained at 90°C. and filled into the so formed semi-rigid container in an amount of 300 cc per container. A cover composed of a laminate same as mentioned above was disposed above the container so that the polypropylene film layer of the cover confronted the polypropylene film layer of the container.

The upper face of the cover was attracted by a vacuum suction panel and held in such a state that a clearance of 8 mm was formed between the cover and container body in an area to be heat-sealed. Saturated steam maintained at a pressure of 2 Kg/cm$^2$ gauge was flashed for 2 seconds at a rate of 900 ml/min. into the container through said clearance in the horizontal direction by means of a stainless steel flashing apparatus via a flow control valve, and immediately thereafter, the cover was let to fall down and was engaged with the container body. Then the first heat-sealing treatment was carried out for 1 second at a heat-seal bar temperature of 250°C. under a pressure of 6 Kg/cm$^2$ being applied to the area to be sealed. After passage of 2 seconds from termination of the first heat-sealing treatment, the second heat-sealing treatment was carried out for 1 second at a heat-seal bar temperature of 170°C. under a pressure of 9 Kg/cm$^2$ being applied to the heat-sealed area. After passage of 2 seconds from termination of the second heat-sealing treatment, the overpressure cooling treatment was conducted for 1 second at a press-cooling bar temperature of 30°C. under a pressure of 6 Kg/cm$^2$ being applied to the heat-sealed area. The resulting packaged article was designated as "Packaged Article I".

A packaged article II was prepared in the same manner as described above except that at the second heat-sealing treatment the applied pressure was changed to 6 Kg/cm$^2$.

The above packaged articles I and II were subjected to the heat-sterilization for 40 minutes at a retort temperature of 121°C. under a retort pressure of 1.8 Kg/cm$^2$ gauge, followed by overpressure cooling.

With respect to about 200 samples each of the so sterilized packaged articles I and II, the leakage test was conducted in the following manner.

Samples were charged in a large pressure vessel so that the sealed face was disposed on the bottom side. An operation of elevating pressure by 0.5 Kg/cm$^2$ and reducing pressure by 0.5 Kg/cm$^2$ from the atomspheric pressure was repeated for 24 hours at a rate of one cycle per hour by means of a vacuumizing-pressurizing pump. The heat-sealed area was treated with a special solution and the polypropylene layer and aluminum foil was delaminated from each other so that the optical inspection was possible. The leakage ratio and the state of permeation of the colored solution into bubbles of the sealed area were examined to obtain results shown in Table 3.

Table 3

Results of Leakage Test Under Pressure Reduction and Pressure Elevation on Sterilized Packaged Articles

| Packaged Article | Number of Samples Tested | Degree of Coloration at Heat-Sealed Area* | Ratio of Leakage of Colored Solution |
|---|---|---|---|
| I | 205 | 0.0074 (−logT) | 0.00% |
| II | 211 | 0.2104 (−logT) | 3.31% |

*The polypropylene film cut from the sealed area was extracted under reflux with a 1:1 mixed solution of ethyl alcohol and ether, and the absorbance was measured at 543 m$\mu$ to determine the coloration degree.

Example III

Two laminates, each of which was composed of an outer layer (12 $\mu$ in thickness) of a polyethylene terephthalate film, an intermediate layer (9 $\mu$ in thickness) of an aluminum foil and an inner layer (70 $\mu$ in thickness) of a high density polyethylene film, were overlapped that the polyethylene film layers confronted each other, and three sides were heat-sealed to obtain a flexible pouch having a length of 18 cm and a width of 13 cm. A solution formed by dissolving 30 g of a thioglycolate medium (TGC medium manufactured by Nippon Eiyo Kagaku) in 1 l of distilled water and passing nitrogen gas therethrough for 30 minutes to accomplish nitrogen gas saturation. The so formed solution maintained at 86° – 92°C. was continuously hot-filled in pouches in an amount of 200 cc per pouch by means of a rotary type filling-sealing machine, and pouches were transported in such a state that both side-sealed ends were held by a pouch clamp-transporting equipment. The transportation of the pouches was once stopped, and saturated steam maintained under a pressure of 2 Kg/cm² gauge was flashed into the pouch from above the opening thereof for 1.4 seconds by means of a steam flashing apparatus in which a stainless steel nozzle opened with 45° from the vertical direction was mounted so that it could move downwardly. The pouches were further transported and after passage of 2 seconds from termination of the steam flashing, they were subjected to the heat-sealing treatment at a heat-seal bar temperature of 180°C. for 1 second under a pressure of 0.5 Kg/cm² being applied to an area to be sealed. Then, the pouches were further transported and after passage of 2 seconds from termination of the heat-sealing treatment, they were subjected to the overpressure cooling treatment for 1 second at a press-cooling bar temperature of 25°C. under a pressure of 5 Kg/cm² being applied to the heat-sealed area. Then, holding of both the side-sealed ends was released and packaged articles were withdrawn.

The so prepared packaged article was subjected to the heat-sterilization in a retort at 121°C. under 1.5 Kg/cm² for 30 minutes, followed by overpressure cooling. Then, the pressure on the retort was released to complete the sterilization treatment. The so obtained packaged article is designated as "Packaged Article I".

For comparison with the conventional method, the following comparative packaged article was prepared.

Packaged Article II (Comparison)

A sterilized packaged article was prepared in the same manner as described above except that at either of the heat-sealing and overpressure cooling steps a pressure of 0.5 Kg/cm² was applied to an area to be sealed.

With respect to about 250 samples each of the packaged articles I and II, the spore suspension dipping test was conducted in the following manner.

The samples were immersed for 24 hours in an aqueous suspension containing spores of an anaerobic spore-forming bacterium, *Clostridium pasteurianum*, at a concentration of $10^7$ spores per ml, and they were stored for 7 days at a thermostat chamber maintained at 30°C. Swelling of the samples by evolution of gas and the spoilage of the content were examined to obtain results shown in Table 4.

Table 4

| Results of Spore Suspension Dipping Test on Sterilized Packaged Article | | | | |
|---|---|---|---|---|
| Packaged Article | Number of Samples Tested | Number of Swelled Samples | Number of Samples of Spoiled Contents | Ratio of Defective Samples (%) |
| I | 256 | 0 | 0 | 0.00 |
| II | 252 | 3 | 2 | 1.19 |

Example IV

Two laminates, each of which was composed of an outer layer (12 $\mu$ in thickness) of a polyethylene terephthalate film, an intermediate layer (9 $\mu$ in thickness) of an aluminum foil and an inner layer (60 $\mu$ in thickness) of a polypropylene film, were overlapped so that the polyethylene films confronted each other and three sides were heat-sealed to obtain a flexible pouch having a size of 13.5 cm × 18 cm. Under passage of oxygen gas 150 g of a glucose-agar medium maintained at 70°C. was hot-packed in an amount of 150 g per pouch by means of a rotary type filling-sealing machine. In a manner as described in Example III, the heat space air was deaerated by means of a steam flashing apparatus, and the heat-sealing treatment was carried out at a heat-seal bar temperature of 210°C. under a pressure of 0.5 Kg/cm² being applied to an area to be sealed for 1 second. After passage of 2 seconds from termination of the heat-sealing treatment, the overpressure cooling treatment was carried out for 1 second at a press-cooling bar temperature of 28°C. under a pressure of 8 Kg/cm² being applied to the heat-sealed area. The so formed packaged article was subjected to the overpressure heat-sterilization treatment at 121°C. under a pressure of 1.5 Kg/cm² for 35 minutes, followed by overpressure cooling. The so sterilized packaged article is designated as Packaged Article I.

For comparison with the conventional method, a comparative sterilized packaged article was prepared in the following manner.

Packaged Article II

A sterilized packaged article was prepared in the same manner as described above except that at both the heat-sealing and overpressure cooling steps, a pressure of 0.5 Kg/cm² was applied to the sealed area.

With respect to about 200 samples each of the packaged articles I and II, the spore suspension dipping test was conducted in the following manner.

Samples were immersed overnight at room temperature in an aqueous suspension containing spores of an aerobic spore-forming bacterium, *Bacillus subtilis*, at a spore concentration of about $10^5$ spores per ml, and the samples were stored for 30 days at a thermostat chamber maintanned at 37°C.

All of the samples were opened and the presence of bacterial colonies on the surface of the medium was examined to obtain results shown in Table 5.

Table 5

Results of Spore Dispersion Dipping Test on Sterilized Packaged Article

| Packaged Article | Number of Samples Tested | Number of Samples in Which Formation of Bacterial Colonies was Observed | Ratio of Defective Samples |
|---|---|---|---|
| I | 208 | 0 | 0.00% |
| II | 217 | 3 | 1.38% |

What we claim is:

1. In the hermetic sealing process for deaerating and heat-sealing a packaged article comprising a container having a heat-sealable resin coating on the inner surface of an area to be heat-sealed, and contents composed of cooked and semi-cooked foods containing a liquid filled in said container under such an atmosphere that an easily-condensable vapor or a condensate thereof resulting from the presence of the liquid is present on innerfaces to be heat-sealed, which process comprises applying at least once to the area to be heat-sealed of the packaged article heat-sealing temperature and pressure necessary for melting and press-bonding the heat-sealable resin and cooling the formed heat-sealed area under elevated pressure; an improvement wherein the pressure applied during the overpressure cooling step or during a second heat-sealing step is made higher than the saturated vapor pressure of the easily-condensable vapor at the temperature of the resin coating in the molten or softened state to effect condensation of vapor disposed within the area being sealed, and said pressure is applied to the heat-sealed area at a temperature lower than the temperature applied during the preceding heat-sealing step.

2. A process set forth in claim 1, wherein the heat-sealable resin coating is composed of a resin melting at a temperature not exceeding 250°C.

3. A process set forth in claim 2, wherein the heat-sealable resin coating is composed of a polyolefin.

4. A process set forth in claim 2, wherein the heat-sealable resin coating is composed of a polyamide.

5. A process set forth in claim 2, wherein the heat-sealable resin coating is composed of a polyester.

6. A process set forth in claim 1, wherein said container is a flexible pouch formed by overlapping laminates composed of a heat-sealable resin layer, a metallic foil and a heat-resistant resin layer so that the heat-sealable resin layer constitutes the inner surface of the pouch and heat-sealing the periphery of the pouch.

7. A process set forth in claim 1, wherein said container comprises a semi-rigid formed container body having a space for filling contents therein and a flange, and a cover, the heat-sealing being effected between said flange of the container body and cover with the heat-sealable resin.

8. A process set forth in claim 1, wherein said heat-sealable resin coating has a thickness of 0.005 to 0.5 mm.

9. A process set forth in claim 1, wherein the easily-condensable vapor is steam.

10. A process set forth in claim 1, wherein residual air in the head space is replaced by steam to effect deaeration.

11. A process set forth in claim 6, wherein prior to the sealing operation, the flexible pouch is deformed by application of a pressure to thereby exclude residual air in the head space.

12. A process set forth in claim 1, wherein the heat-sealing operation is conducted at least twice and at the first heat-sealing step such temperature and pressure as meet the following requirement $$Ts + 130 \geq T_1 \geq Ts + 30$$
$$Ps - 1 \geq P_1 \geq 0.5$$

wherein $T_1$ stands for the temperature (°C.) of a heat-seal bar at the first heat-sealing procedure, $Ts$ is a temperature (°C.) at which the said resin coating begins softening or melting, $P_1$ is a pressure (Kg/cm² gauge) applied to the area to be sealed, and $Ps$ stands for the saturated steam pressure (Kg/cm² gauge) corresponding to the temperature $T_1$, are applied to the area to be sealed.

13. A hermetic sealing process for forming a heat-sterilizable packaged article by deaerating and heat-sealing a packaged article comprising a container having a heat-sealable resin coating on the inner surface of an area to be heat-sealed, and contents composed of cooked or semicooked foods containing a liquid filled in said container under such an atmosphere that an easily-condensable vapor or a condensate thereof resulting from the presence of the liquid is present on innerfaces to be heat-sealed, said process comprising applying to the area to be heat-sealed of the packaged article heat-sealing temperature $T_1$ (°C.) and pressure $P_1$ (Kg/cm²) necessary for melting and press-bonding the heat-sealable resin coating, then applying to the formed heat-sealed area a heat-seal bar temperature $T_2$ (°C.) which is lower than the temperature $T_1$ applied at the first heat-sealing step but higher than the temperature at which the heat-sealable resin coating begins melting or softening and a pressure $P_2$ (Kg/cm² gauge) which is higher than the pressure $P_1$ applied during the first heat-sealing step and also higher than the saturated vapor pressure of the easily-condensable vapor corresponding to said temperature $T_2$ to effect condensation of vapor disposed within the area sealed by the first heat-sealing step, and cooling the heat-sealed area under an elevated pressure.

14. A process set forth in claim 13, wherein the first and second heat-sealing steps are conducted so that the following requirements are satisfied $$Ts + 130 \geq T_1 \geq Ts + 30$$
$$Ps - 1 \geq P_1 \geq 0.5$$
$$Ps' + 5 \geq P_2 \geq Ps'$$
$$Ts + 50 \geq T_2 \geq Ts$$
$$T_1 > T_2$$

wherein $T_1$, $T_2$, $P_1$ and $P_2$ are as defined above, $Ts$ stands for a temperature (°C.) at which the heat-sealable resin coating begins melting or softening, $Ps$ is a saturated steam pressure (Kg/cm² gauge) corresponding to the temperature $T_1$, and $PS'$ is a saturated steam pressure (Kg/cm² gauge) corresponding to the temperature $T_2$.

15. A process set forth in claim 13, wherein the heat-sealable resin is a high density polyethylene, and the first heat-sealing operation is carried out at a heat-seal bar tempereature of 160° to 260°C. under a pressure of 0.5 to 5 Kg/cm² gauge being applied to the area to be sealed and the second heat-sealing operation is carried out at a heat-seal bar temperature $T_2$ of 118° to 128°C. under an applied pressure (kg/cm² gauge) higher than the saturated steam pressure $Ps'$ (Kg/cm² gauge) corresponding to said temperature $T_2$.

16. A process set forth in claim 13, wherein the heat-sealable resin is a polypropylene, and the first heat-sealing is carried out at a heat-seal bar temperature of 180° to 280°C. under a pressure of 0.5 to 5 Kg/cm² gauge being applied to the area to be sealed and the second heat-sealing operation is carried out at a heat-seal bar temperature $T_2$ of 165° to 175°C. under an applied pressure (Kg/cm² gauge) higher than the saturated steam pressure (Kg/cm² gauge) corresponding to said temperature $T_2$.

17. A hermetic sealing process for forming a heat-sterilizable packaged article by deaerating and heat-sealing a packaged article comprising a container having a heat-sealable resin coating on the inner surface of an area to be heat-sealed, and contents composed of cooked and semicooked foods containing a liquid filled in said container under such an atmosphere that an easily-condensable vapor or a condensate thereof resulting from the presence of the liquid is present on innerfaces to be heat-sealed, said process comprising applying to the area to be heat-sealed on the packaged article heat-sealing temperature and pressure necessary for melting and press-bonding the heat-sealable resin coating, and immediately thereafter, applying under cooling to the heat-sealed area of the packaged article a pressure higher than the heat-sealing pressure to effect condensation of vapor disposed within the area being sealed, said pressure being within a range expressed by the following formula $$Ps + 5 \geq P \geq Ps - 1$$

wherein P is a pressure (kg/cm² gauge) applied at the overpressure cooling step, and $Ps$ designates a saturated steam pressure (Kg/cm² gauge) corresponding to the temperature $T_1$ (°C.) of the heat-seal bar during the heat-sealing procedure.

18. A process set forth in claim 17, wherein the heat-sealing operation is carried out under such conditions as meet the following requirements $$Ts + 130 \geq T_1 \geq Ts + 30$$
$$Ps - 1 \geq P_1 \geq 0.5$$

wherein $T_1$ is a temperature (°C.) of a heat-seal bar temperature, $Ts$ is a temperature (°C.) at which the heat-sealable resin coating begins softening or melting, $P_1$ designates a pressure (Kg/cm² gauge) applied to the area to be sealed, and $Ps$ is as defined above, and the heat-sealed area is cooled under an elevated pressure within at most 3 seconds from termination of the heat-sealing operation.

* * * * *